United States Patent Office 3,437,190
Patented Apr. 8, 1969

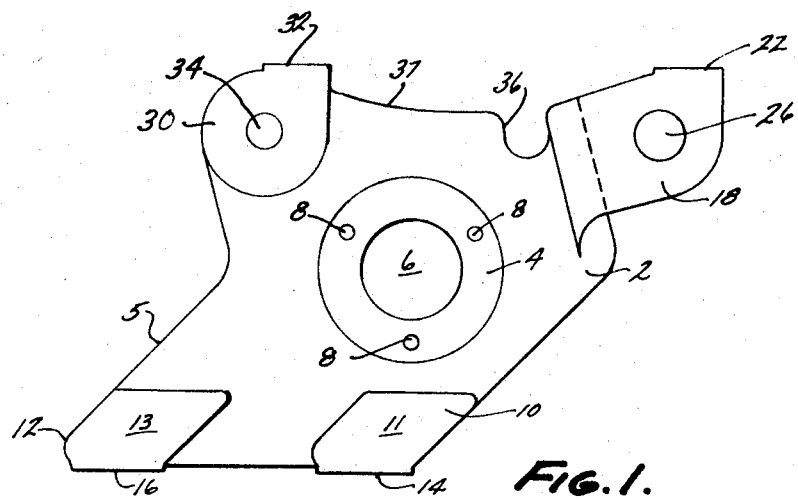
FIG. 1.
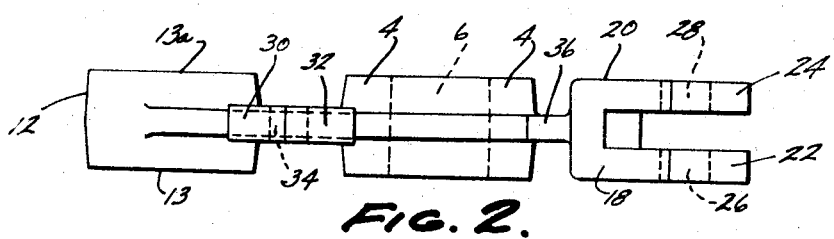
FIG. 2.
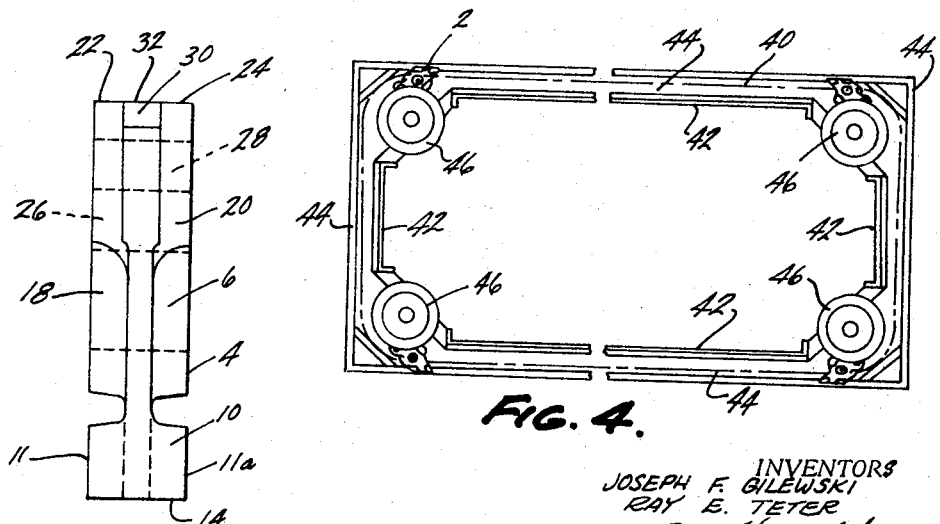
FIG. 3.
FIG. 4.
INVENTORS
JOSEPH F. GILEWSKI
RAY E. TETER
BY
ATTORNEYS

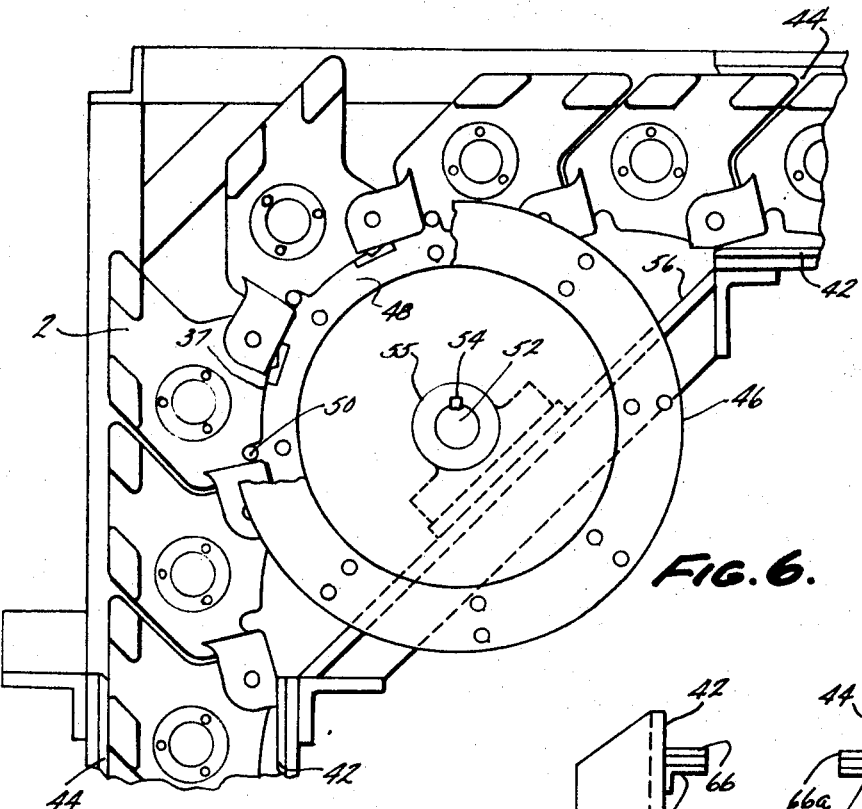
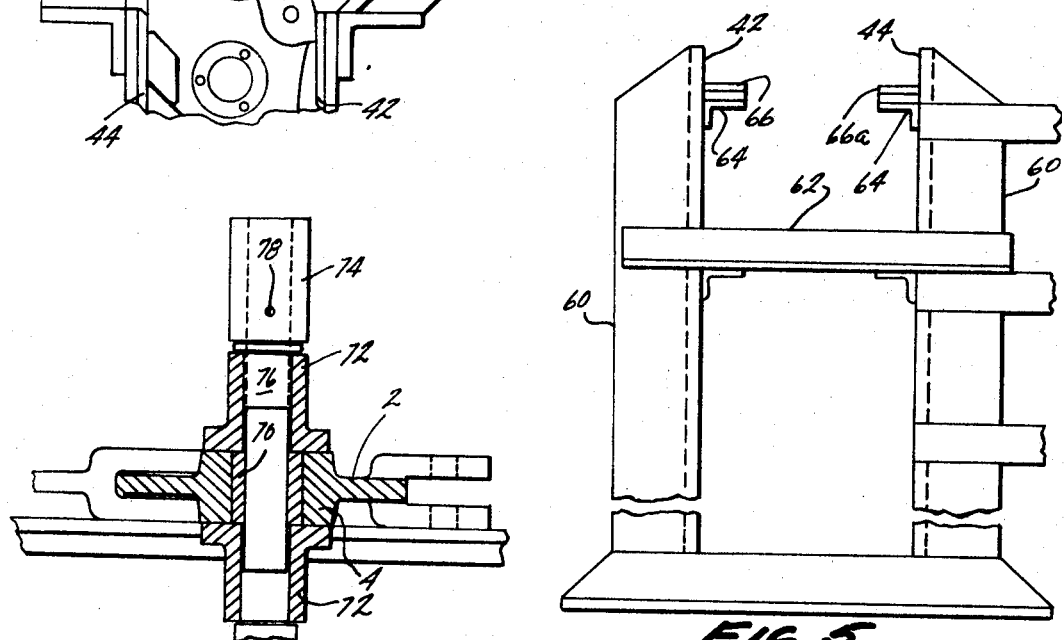

3,437,190
CONVEYOR AND NOVEL LINK THEREFOR
Joseph F. Gilewski, Grand Rapids, and Ray E. Teter, Lake Leelanau, Mich., assignors to Electrical & Mechanical Service Co., Grand Rapids, Mich., a corporation of Michigan
Continuation-in-part of application Ser. No. 499,260, Oct. 21, 1965. This application Aug. 22, 1967, Ser. No. 662,415
Int. Cl. B65g 15/00, 17/00, 19/00
U.S. Cl. 198—131                    13 Claims

ABSTRACT OF THE DISCLOSURE

This disclosure relates to a conveyor system, especially adapted for buffing operations, in which system a plurality of pairs of conveyor support members, for example L-shaped members, face each other and are opposed in a generally horizontal plane forming a closing track for a conveyor chain. The conveyor system is composed of a plurality of rigid links, for example, rotatably attached at inside corners of each link. A plurality of bearing members are provided on each link, which bearing members have bearing surfaces contracting the opposed guiding walls of the L-shaped members. The shape of the links are such that the links slide between the opposed walls with relatively close tolerances.

---

This application is a continuation-in-part of Ser. No. 499,260, filed Oct. 21, 1965 now Patent 3,337,024.

This invention relates to conveyor systems and novel links therefor. In one of its aspects it relates to a conveyor system comprising a conveyor chain having a plurality of individually rigid links, flexibly connected to one another, forming a closed loop, support means for the conveyor chain including at least one pair of longitudinal guide members, each guide member having a link supporting surface and a link guiding wall, each guide member oriented in facing relationship with the other guide member so as to form a conveyor chain working path with an open central portion, and a drive means for the conveyor chain to cause the conveyor chain to move along the guide members.

In another of its aspects, the invention relates to a novel link for a conveyor system, the link having a generally planar web with an upstanding collar and a plurality of bearing means positioned at the outer edge of the web and having a thickness substantially greater than that of the web, and means along one of the edges of the link for rotatably attaching an adjacent link such that the link is rotatable with respect to an adjacent link about an axis substantially perpendicular to the plane of the web.

Present modes of product fabrication often require assembly line buffing techniques. As a rule, such techniques consist of mounting the article to be buffed on some sort of a conveyor system and rotating the conveyor in such a manner that the article sequentially comes into contact with a number of buffing mechanisms. The conveyor systems which are currently utilized to perform this operation are commercially unsatisfactory in many respects. These systems generally consist of a pair of parallel rotating chains mounted in spaced relationship on a frame. A work bearing crosspiece is placed across the space and its ends are affixed to the chains. The articles to be buffed are then supported in some fashion on the work bearing crosspiece. These work bearing crosspieces which carry the article to be buffed have a tendency to tilt when the article comes into contact with the buffing mechanism. This tilting is highly undesirable since it not only interferes with the accuracy of the buffing operation but also causes much undue wear on the conveyor apparatus. The problem becomes particularly acute when large articles are being buffed since the weight of the article itself is often enough to place a maximum allowable stress on the conveyor apparatus.

In copending Ser. No. 499,260, filed Oct. 21, 1965, there is disclosed and claimed a conveyor system, especially for buffing, in which two continuous elongated guides having lower track members and side retaining wall members oriented in facing fashion so as to form a conveyor chain path are provided to support a conveyor system having rigid links flexibly connected to one another and slidably positioned between the side retaining walls of the elongated guides. The conveyor system disclosed is generally an over-and-under system whereby the return portion of the closed conveyor path is below the upper or work portion.

In over-and-under systems, generally less than half of the conveyor link is useful due to the return portion being beneath the upper portion and usually inside the machine.

We have now discovered a novel conveyor system and a novel conveyor link for the system especially adapted for buffing operations, in which system, in one embodiment thereof, all portions of the conveyor loop are useful in the buffing operation. The system employs a longitudinal support and guiding members to support and guide the conveyor belt containing rigid links rotatably attached to each other and slidable between the guiding surfaces of the longitudinal members with relatively close tolerances. Each link is preferably rotatable with respect to an adjacent link about an axis which is substantially perpendicular to the general plane of the link member.

By various aspects of this invention, one or more of the following, or other objects, can be obtained.

It is an object of this invention to provide a conveyor system for supporting work in which work is maintained in a relatively fixed line, despite traverse pressure to the work on the conveyor.

It is a further object of this invention to provide a conveyor system for buffing and the like.

It is a still further object of this invention to provide a novel work supporting link for an endless conveyor belt in which all portions of the conveyor path are adaptable for performing operations on the work.

It is still another object of this invention to provide a novel conveyor system with rigid links rotatably connected, wherein the connections are such as to prevent twisting or deformation of the links, either by themselves or with respect to other adjacent links.

Other aspects, objects, and the several advantages of this invention are apparent to one skilled in the art from a study of this disclosure, the drawings, and the appended claims.

According to the invention, there is provided a novel conveyor apparatus system comprising a conveyor chain having a plurality of individually rigid links, flexibly connected to one another and forming a closed loop. The conveyor chain is supported on a support means which include at least one pair of longitudinal guide members, each having a link supporting surface and a link guiding wall, each of the guide members being oriented in the basic fashion with respect to the other guide member so as to form therebetween a conveyor chain working path with an open central portion. The support means are so spaced from each other so as to permit rigid positioning of the links therebetween with relatively close tolerances.

A drive means for the conveyor chain is provided to cause the conveyor chain to move along the support means.

Preferably the loop of the conveyor chain is non-vertical, most preferably it is substantially horizontal.

Further, according to the invention, there is provided a novel link for a conveyor system especially adapted for a buffing operation, the link comprising a web member with an upstanding collar adapted to support a work holding means, a plurality of bearing surfaces along the edges of the web, the bearing surfaces being substantially thicker than the thickness of the web. At two corners along one edge of the web, there is provided a means for rotatably attaching an adjacent link such that the link is rotatable about an axis which is substantially perpendicular to the plane of the web.

The invention will now be described with reference to the accompanying drawing in which:

FIG. 1 is a side elevational view of a novel link according to the invention;

FIG. 2 is a top view of the link shown in FIG. 1;

FIG. 3 is a right side view of the link shown in FIGS. 1 and 2;

FIG. 4 is a plan view of a schematic representation of the conveyor system according to the invention;

FIG. 5 is a sectional view taken along lines V—V of FIG. 4 without the conveyor belt;

FIG. 6 is an enlarged view of one corner of the apparatus shown in FIG. 4; and

FIG. 7 is a sectional view through the link shown in FIGS. 1 through 3 with a work supporting member attached thereto.

Referring now in particular to FIGS. 1, 2, and 3, there is provided a novel link having a substantially planar web portion 2 with an upstanding collar 4 in the central portion thereof. The collar 4 has an aperture 6 for receiving a work supporting member and a plurality of holes 8 for attaching a bushing member. At one edge of the web 2 there are provided bearing means 10 and 12 having bearing surfaces 14 and 16. Bearing surfaces are also provided at 13 and 13a on bearing member 12 and at 11 and 11a on bearing member 10. As can be seen from FIGS. 2 and 3, bearing members 10 are substantially thicker than the thickness of web 2 and extend outwardly therefrom.

At the other side of the web there is provided a tongue member 30 having a thickness slightly greater than that of web 2 and a central aperture 34 in the tongue. A bearing surface 32 is provided at an outer portion of tongue 30. At the other corner of the web 2 there is provided a yoke shaped member having arms 18 and 20 with apertures 26 and 28, respectively. The outer side extremities of arms 18 and 20 are bearing surfaces which, as can be seen from FIGS. 2 and 3, are substantially coplanar with bearing surfaces 11, 13, 11a, and 13a, respectively of bearing members 10 and 12. A bearing surface 22 on arm 18 and a bearing surface 24 on arm 20 are substantially coplanar with bearing surface 32 of tongue 30.

As can be seen from FIG. 1, bearing surfaces 14 and 16 are also substantially coplanar. Bearing surfaces 11 and 13 are substantially coplanar with the outer portions of the upstanding central collar 4.

Between tongue 30 and arms 18 and 20, a generally arcuate surface 37, which is concave outwardly is provided. A slot 36 is provided adjacent the yoke member for a purpose which will be described hereinafter.

In FIG. 1 it can be seen that the novel link is somewhat arrow-shaped in configuration. Between the two parallel surfaces defined on the one hand by bearing surface 22, 24, and 32, and on the other hand by bearing surfaces 14 and 16, the web member 2 has V-shaped edges 3 and 5.

The novel link shown in FIG. 1 is connected to a similar novel link through the engagement of a tongue member 30 between arms 18 and 20 of an adjacent link. A pin (not shown) is inserted into holes 26 and 28 of one link, and through hole 34 of the adjacent link to attach the two links. A plurality of links are assembled in this maner to produce an endless chain in which the rotation of each link with respect to an adjacent link is about an axis which is substantially perpendicular to the plane of the web.

The endless chain is assembled into an apparatus such as that shown in FIG. 4, in which a pair of opposing link guiding walls 42 and 44 are spaced about a circular path. A plurality of sprocket wheels 46 are provided to guide the conveyor belt around the corners. One or more sprockets can be provided with a rotatably driven shaft to cause the belt system to move along the supporting and guiding members.

Referring now to FIG. 5 in particular, a conveyor chain support means comprising link supporting surfaces 66 and link guiding walls 42 and 44. The link supporting surfaces 66 and 66a, as well as the link guiding walls 42 and 44, are bearing surfaces so that friction between the conveyor belt and the supporting means is minimized. As is understood by one skilled in the art, the use of lubricants, such as graphite on the bearing surfaces, is well known and preferred in the use of the apparatus according to the invention. The guide members for the conveyor system are supported by suitable bracket supports 64, which are rigidly attached to upright members 60, which in turn are attached to the floor and are attached to each other through a cross member 62. The guide walls 42 and 44 are so spaced that the individual links can be supported on link supporting surfaces 66, and the bearing surfaces of the links are directly adjacent the guiding surfaces 42 and 44 with close tolerances therebetween. Thus, when a workpiece is placed in the link and is subject to tilting or transverse pressure, the pair of longitudinal guide members will prevent the link from being twisted or tilted.

As can be seen from FIG. 6, the links are rotatable about sprocket 46, which is attached to shaft 52 having key 54 through bushing 55. The shaft 52 can have a suitable rotatable power means attached thereto. Pins 50 on outer portion 48 of sprockets 46 provide for engaging means in slot 36 of the links to provide guiding and power means to move the links along the guide members.

At least some of the links have work support members attached thereto, as shown in FIG. 7. An annular bearing member 70 is positioned within aperture 6 of collar 4 between bushings 72. The bushings 72 are attached to the collar through suitable screws (not shown) which extend into hole 8 of the collar 4. A rod 76 extends through the central portion of the collar and is attached to a work support member through pin 78. As has been disclosed in said copending Ser. No. 499,260, means can be provided for rotating the shaft 76 relative to the link to turn the workpiece during the buffing operation.

Whereas the invention has been described with reference to a generally horizontally conveyor loop, it is within the scope of the invention to provide a generally vertical conveyor loop whereby the workpieces will extend substantially horizontally.

The supporting surfaces 66 and 66a have been described as substantially coplanar. However, it is not necessary for the operation of the invention that the surfaces be substantially coplanar, so long as the bearing surfaces on the link are shaped to cooperate with the supporting members 66 and 66a. For example, the outer support members 66a could be higher than that of the inner support members 66 and the bearing surfaces 11a and 13a would accordingly be "higher" relative to the plane of the bearing surface at the outer portion of arm 20.

The invention has been described with reference to generally parallel link guiding wall members 42 and 44. However, it is within the scope of the invention to provide for non-parallel walls so long as the bearing surfaces on the links are shaped to cooperate with the walls, such as to prevent relative rotation of the links when traverse pressure is applied to the work to provide close tolerances and prevent lateral and/or twisting motion of the conveyor. However, it is preferred that the guiding walls 42 and 44 are parallel and the supporting surfaces 66 and 66a be substantially coplanar in order to facilitate the construction of the supporting surfaces as well as the construction of the novel links. The link can be cast in one piece or can be made from separate pieces. Preferably, the link is cast as one piece, and the bearing surfaces are ground in a minimum operations. For example, the bearing surfaces at 11, 13, and the outer portion of arm 18 can be ground in one operation, whereas the other bearing surfaces at 11a, 13a, and the outer portion of arm 20 can be machined in a second operation. Similar operations can finish bearing surfaces 22, 24, and 32 and bearing surfaces 14 and 16. Thus, in four simple machining operations, the bearing surfaces are complete.

The construction of the tongue and yoke is such as to provide a rigid connection between adjacent links, except in one direction of rotation, i.e. through holes 26, 34, and 28.

The link of the invention can be made from many different kinds of metal, including steel, stainless steel, aluminum, copper, and cast iron. Preferably, cast iron in the form of nodular or ductile iron is used due to the self-lubricating properties of this material.

It is obvious that bearing surface 32 is not required for operation of the invention since it will be positioned between arms 18 and 20 which contain bearing surfaces 22 and 24. However, in the preferred embodiment of the invention, a bearing surface is provided at 32 to provide for easier guiding of bearing surfaces 22 and 24. The presence of bearing surface 32 facilitates proper positioning and alignment of bearing surfaces 22 and 24 during the guiding operation.

For operation of the invention, it is necessary that bearing surfaces only be provided on one side of the web such as at 13, 11, and 18, for example. However, in order to increase the flexibility of uses for the links, it is preferred to provide bearing surfaces on both sides of the web. When there are bearing surfaces on both sides of the web such as at 13, as well as 13a, for example, the web can be used in a pair of U-shaped channels or can be used with either side resting on the link supporting surfaces 66 and 66a.

Reasonable modification and variation are possible within the scope of the foregoing disclosure, the drawings, the claims of the invention, without departing from the spirit thereof.

We claim:

1. A conveyor apparatus comprising:
   (A) a conveyor chain having a plurality of individually rigid links flexibly connected to one another, forming a closed loop, each of said links having a centrally disposed aperture and a work supporting member extending through said links and rotatably supported thereby;
   (B) support means for said conveyor chain including a plurality of pairs of longitudinal guide members forming a closed loop for said conveyor chain, said closed loop forming a plane which is generally non-vertical, each guide member having a link supporting surface and a link guiding wall, each of said guide members oriented in facing configuration with the other guide member so as to form therebetween a conveyor chain working path with an open central portion, said members being so spaced from each other to permit positioning of said conveyor chain therebetween with close tolerances; and
   (C) drive means for said conveyor chain to cause said conveyor chain to move along said support means.

2. A conveyor apparatus according to claim 1, wherein each of said pairs of said longitudinal guide members are substantially horizontal, said plane containing said pairs of said guide members is substantially horizontal, and said conveyor links are rotatable with respect to each other about an axis which is generally perpendicular to the plane of said guide members.

3. A conveyor apparatus according to claim 2, wherein sprocket wheels are provided between pairs of guide members, the outer portions of each of said sprocket wheels being aligned with the innermost link guide wall of each of said pairs of guide members, and said drive means comprises at least one sprocket wheel operably connected to a rotatable power source.

4. A conveyor apparatus according to claim 3, wherein said sprockets have pins which project substantially perpendicular to the plane of said sprocket wheels and said pins engage slots on a surface of said conveyor links.

5. A conveyor apparatus comprising:
   (A) a conveyor chain having a plurality of individually rigid links flexibly connected to one another, forming a closed loop, each of said links having a centrally disposed aperture and a work supporting member extending through said links and rotatably supported thereby;
   (B) support means for said conveyor chain including at least one pair of longitudinal guide members, each guide member having a link supporting surface and a link guiding wall, each of said guide members oriented in facing configuration with the other guide member so as to form therebetween a conveyor chain working path with an open central portion, said members being so spaced from each other to permit positioning of said conveyor chain therebetween with close tolerances, each link having a web with an upstanding collar, having outer and inner bearing surfaces, and having means along an edge of said link for rotatably attaching an adjacent link such that said link is rotatable about an axis substantially perpendicular to the plane of the web.

6. A novel link for a conveyor system comprising a web portion having an upstanding collar for supporting a workpiece, bearing members having bearing surfaces along two opposite edges of said web, said bearing members being substantially thicker than the thickness of said web member, and at least a portion of said bearing members having a second bearing surface which is substantially parallel to the plane of said web member, and means along one of said edges for rotatably attaching an adjacent link such that said link is rotatable about an axis substantially perpendicular to the plane of the web.

7. A conveyor link according to claim 6, wherein said attaching means comprises an annular shaped tongue member at one end of said edge and a tongue receiving yoke at the other end of said edge, said yoke being so shaped to receive said tongue therebetween, said yoke containing aperture means which are alignable with said annular portion of said tongue, and means rotatably connecting said tongue of one link with a yoke of an adjacent link.

8. A link according to claim 7, wherein said outer bearing surfaces on each edge are substantially coplanar and at least some of said bearing surfaces on said bearing members substantially parallel to said web member are coplanar.

9. A link according to claim 8, wherein said bearing members are located at four corners of said web member.

10. A conveyor link according to claim 9, wherein a third and a fourth side of said web member connects said edges containing said bearing surfaces, and each of said third and fourth sides are V-shaped such that the apexes of the V's are aligned in adjacent links.

11. A link according to claim 7, wherein said tongue and said yoke form bearing members, and said bearing surfaces along one edge of said web on said tongue and yoke are substantially coplanar.

12. A link according to claim 6, wherein said side of said web containing said rotatable attaching means is generally arc-shaped, concave outwardly.

13. A link according to claim 6, wherein said edge containing said rotatably attaching means has an indented slot therein.

References Cited

UNITED STATES PATENTS

| | | | |
|---|---|---|---|
| 1,110,480 | 9/1914 | Burpee | 198—181 |
| 2,698,076 | 12/1954 | Nilsson | 198—131 |
| 3,337,024 | 8/1967 | Gilewski | 198—189 XR |

EDWARD A. SROKA, *Primary Examiner.*